United States Patent
Trautweiler

(10) Patent No.: US 8,258,415 B2
(45) Date of Patent: Sep. 4, 2012

(54) METHOD OF MONITORING THE FREE MOBILITY OF A FORCE-MEASURING DEVICE AND FORCE-MEASURING MODULE FOR APPLYING METHOD

(75) Inventor: Christoph Trautweiler, Regensdorf (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 13/033,632

(22) Filed: Feb. 24, 2011

(65) Prior Publication Data

US 2011/0203857 A1 Aug. 25, 2011

Related U.S. Application Data

(63) Continuation of application No. PCT/EP2009/061158, filed on Aug. 28, 2009.

(30) Foreign Application Priority Data

Aug. 29, 2008 (EP) .................................... 08163322

(51) Int. Cl.
*G01G 23/00* (2006.01)

(52) U.S. Cl. ...................................... 177/185; 702/101

(58) Field of Classification Search ................. 177/185; 702/101
See application file for complete search history.

(56) References Cited

U.S. PATENT DOCUMENTS

| 4,482,022 A | 11/1984 | Komoto | |
|---|---|---|---|
| 4,553,618 A * | 11/1985 | Kusmenskji et al. | 177/185 |
| 4,722,456 A | 2/1988 | Laidlaw et al. | |
| 4,804,053 A | 2/1989 | Nordstrom | |
| 5,347,092 A * | 9/1994 | Buchs et al. | 177/212 |
| 5,526,697 A | 6/1996 | Tada et al. | |
| 5,898,135 A * | 4/1999 | Nakazaki | 177/136 |
| 7,112,750 B2 | 9/2006 | Emery et al. | |
| 2008/0110681 A1 | 5/2008 | Von Arb et al. | |
| 2009/0242279 A1 | 10/2009 | Freydank et al. | |
| 2010/0078228 A1* | 4/2010 | Trautweiler et al. | 177/25.13 |

FOREIGN PATENT DOCUMENTS

| EP | 0432979 A2 | 6/1991 |
|---|---|---|
| EP | 0818669 A1 | 1/1998 |

\* cited by examiner

*Primary Examiner* — Randy W Gibson
(74) *Attorney, Agent, or Firm* — Standley Law Group LLP

(57) ABSTRACT

A method, and a device that is operable according to the method, for monitoring the condition of a force-measuring device, particularly a weighing device having a movable force-transmitting portion through which a force that is acting on the force-measuring device is transmitted to a measurement transducer that generates a measurement signal corresponding to the applied force, whereupon the signal is brought into the form of a display indication or passed along for further processing. In the method and device of the invention, at least one parameter is determined, which parameter characterizes the free mobility of the force-transmitting portion, or a change in the free mobility of the force-transmitting portion over time. The parameter is then compared to at least one threshold value, and based on the result of the comparison an action of the force-measuring device may be triggered.

19 Claims, 5 Drawing Sheets

METHOD OF MONITORING THE FREE MOBILITY OF A FORCE-MEASURING DEVICE AND FORCE-MEASURING MODULE FOR APPLYING METHOD

CROSS-REFERENCE TO RELATED APPLICATIONS

This application is a continuation under 35 USC §120 of PCT/EP2009/061158, filed 28 Aug. 2009, which is in turn entitled to benefit of a right of priority under 35 USC §119 from European patent application 08163322.4, which was filed 29 Aug. 2008. The content of each of these applications is incorporated by reference as if fully recited herein.

TECHNICAL FIELD

The present invention is directed to a method of monitoring a force-measuring device, specifically a weighing device, and also concerns a force-measuring device and a force-measuring module that are operable according to the method.

BACKGROUND

To determine the force acting on a force-measuring device, the latter is normally equipped with a force receiver, a force-transmitting portion, and a measurement transducer. In this arrangement, the input force is received by means of a force receiver and passed on by way of the force-transmitting portion to the measurement transducer. For example in a weighing device, the input force is represented by the weight force of the weighing object. The force receiver serves to accept the input force and is typically realized in the form of a measuring plate, a weighing pan, or a weighing platform. The force-transmitting portion conveys the force from the force receiver to the measurement transducer and is configured for example as a rod, a lever mechanism, or a load-supporting device.

The path taken by the force from the force receiver through the force-transmitting portion to the measurement transducer defines a force flow path. In the example of a balance, the force flow path follows the direction of gravity, i.e., it proceeds vertically from top to bottom.

The measurement transducer is a mechanical-to-electrical converter that transforms the input quantity, i.e., a force, into a corresponding electrical measurement signal. Accordingly, in a weighing device the measurement transducer produces an electrical measurement signal that corresponds to the weight force exerted by the weighing object. This electrical measurement signal is normally passed on through a signal-processing unit to an indicator unit or to a further processing device, for example a system controller.

In order to obtain the highest possible measurement accuracy, it is important that, as far as possible, none of the force conveyed through the force-transmitting portion is lost in the transmission. Losses can occur as a result of a mechanical short circuit, a so-called force shunt, if portions of the force that is to be transmitted are drained off through parasitic mechanical connections. These portions will consequently not be received by the force transducer, so that considerable measurement errors can occur as a result.

A force shunt occurs if movable parts of the force-transmitting portion come into contact with other objects or with persons in such a way that the free mobility of the force-transmitting portion in the direction of the force flow path is restricted. This is the case for example if during the weighing process the movable transmitting rod comes into contact with the stationary rim of a passage opening for the transmitting rod.

The terms "mobility" and "movement" of the force-transmitting portion are distinguished from each other in that the former relates to a mechanical relationship between adjacent parts, while the latter relates to a change in spatial position. For example, in a weighing device disclosed in EP 0 254 594 the mobility of the force transmission is achieved through flexure-pivoted beams. A sensor, which is arranged on one of the beams, serves to detect extraneous disturbances as abnormal accelerations. However, what is being monitored is not the mobility of the beam as enabled for example by the flexibility of its pivotal connections. Rather, the latter is considered as a given, and according to the teachings of EP 0 254 594, lower detected values of acceleration are interpreted as a lower level of disturbances.

Furthermore, accumulations of dust on the force-transmitting portion and on the stationary parts can lead to so-called dust bridges. These dust bridges can build up over time and, without being noticed, can lead to force shunts and thus to measurement errors.

The known state of the art offers a variety of methods to avoid a force shunt. For example, in a balance disclosed in DE 102 53 601, measurement errors due to dust accumulations in the area between the stationary housing and the vertically movable force-transmitting member can be prevented by a stream of gas directed away from the movable force-transmitting member.

A force-measuring device is disclosed in U.S. Pat. No. 4,804,053, where the force is transmitted by means of so-called rocker pins or self-aligning struts. If they are designed with the appropriate dimensions, these self-aligning struts have the property that they position themselves on their own in the direction of the force flow path. For example in a weighing station for vehicles, this self-aligning property has the effect that the weigh bridge always settles into a position where it is free to swing laterally, although it will normally bump against the lateral stops when the vehicle to be weighed is driven onto the weigh bridge. As the force-transmitting members always align themselves in the direction of the force flow, there is no opportunity for transverse forces to occur and consequently, a parasitic leakage of the measurement force is avoided.

The aforementioned devices work well under normal conditions, but under difficult operating conditions they can no longer prevent, or will not sufficiently prevent, the occurrence of a force shunt, for example under loads that stress the device to its limits or in abnormal situations such as a faulty installation of the force-measuring device, incorrect operation, or an excessive accumulation of dirt. As a consequence, force shunts with their associated measurement errors can occur in spite of the aforementioned preventive measures.

The present invention is therefore directed to a method of monitoring the condition of a force-measuring device, specifically a balance, and to providing a suitable force-measuring device, whereby a simple and cost-effective design concept and operation of the measuring device becomes achievable, while stringent requirements in regard to measurement accuracy and stability are simultaneously met.

This task is solved by a method, a force-measuring device and a force-measuring module of the present invention.

SUMMARY OF THE GENERAL INVENTIVE CONCEPT

The invention concerns a method, and a device that is suitable to operate according to said method, for monitoring the condition of a force-measuring device. The present invention is particularly applicable to a weighing device having a movable force-transmitting portion through which a force that is acting on the force-measuring device is transmitted to a measurement transducer which generates a measurement signal corresponding to the applied force, whereupon the signal is brought into the form of a display indication or passed along for further processing. In the method and device of the invention, at least one parameter is being determined, which parameter characterizes the free mobility of the force-transmitting portion or a change in the free mobility over time. The parameter, which serves to detect whether a normal condition of free mobility or a restriction of freedom exists in the force-transmitting portion, is then compared to at least one threshold value, and based on the result of the comparison, i.e., in case a restriction of the free mobility has been detected, an action of the force-measuring device is triggered. This opens the possibility, in particular under difficult operating conditions, that restrictions of the free mobility of the force-transmitting portion can be detected, transmitted and brought to the attention of the user in a simple manner. Furthermore, the cost and effort required to perform the time-consuming manual checking of the free mobility on a regular basis can be reduced or even entirely eliminated. Accordingly, there are advantages in regard to the measurement accuracy and the stability of the force-measuring device. Furthermore, errors and wear damage can be more accurately pinpointed and maintenance work can be planned better and performed more efficiently. In some cases, there may be further cost advantages resulting for example from appropriately adapted requirements for the clean room environment of the force-measuring device. The invention thus leads to a simple and cost-effective design and operation of the force-measuring device.

Advantageously, the mobility of the force-transmitting portion is determined with an appropriate mobility sensor that is on the one hand mechanically connected to the force-transmitting portion and on the other hand electrically connected to a comparator. The term "mobility sensor" as used herein is meant to encompass all kinds of measuring devices that are suitable for measuring the mobility, or change in mobility, of the force-transmitting portion. Thus, translatory as well as rotary or angle-dependent movements can be measured. Accordingly, the parameter can characterize a translatory, rotary or angle-dependent movement or change of movement of the force-transmitting portion.

The mobility sensor can be based on different principles of measurement and can be designed in different practical forms. The mobility can be determined for example through a measurement of velocity, a velocity component, a displacement and/or an angle with a subsequent calculation of the time derivative, a measurement of acceleration or of an acceleration component.

As a further possibility, the mobility sensor can be based on a measurement of inertia or on the principle of measuring the direction of a force that is acting on the mobility sensor, specifically the force of gravity. As an example, the mobility can be determined from a position measurement of the deflection of a pendulum or a liquid.

After the parameter has been determined, it is compared by the comparator to at least one threshold value. One or more threshold values can be stored in the comparator or can be available from a further unit, for example a memory unit or a processor. The threshold values can be taken from regulatory codes such as national or international standards, they can be determined by comparative measurements, or they may have been specified by the manufacturer of the force-measuring device.

The invention is of special advantage in force-measuring devices that are used in difficult operating environments with a high risk of an unnoticed force shunt, for example due to an out-of-level position, an unstable setup, or a change of position of the force-measuring device, in a dusty atmosphere, with a heavy dirt accumulation on the weighing device, or due to an impermissible contact of the movable parts, specifically the weighing pan, with objects or persons. The monitoring in accordance with the invention is particularly advantageous if the danger of a force shunt is only temporary, so that it could hardly be detected in a manual check.

Use of the present invention may also be particularly well-suited to outdoor applications, for example in weighing systems for vehicles, because the weighing device can in this case be exposed to ambient environment factors such as temperature changes or accumulations of dirt, ice and snow. In addition, these ambient factors can change strongly in a very short period of time, so that there is an increased danger that a force shunt may escape notice or may be noticed too late. With the method according to the invention, however, a force shunt can be detected early on and in an efficient manner.

With self-aligning struts, deterioration over time can occur as a result of wear of the contact surfaces. The self-aligning struts will in this case no longer be able to align themselves correctly so that transverse forces, and thus force shunts, can establish themselves. These wear-down effects, too, can be brought under control with the method and the corresponding device according to the invention.

Furthermore, self-aligning struts can compensate for the transverse forces only up to a certain limit (i.e., up to the point where the force receiver meets the lateral stop bumpers), where a force shunt will occur in spite of the self-aligning struts. These situations can be reliably detected with the method and device of the invention, without the need for a continuous manual checking of the force-measuring device.

The method according to the invention can also be used for a wide variety of different force-measuring devices whose measurement transducers can be based on a diversity of principles, for example a measurement with strain gauges, with capacitive, inductive or piezoelectric sensors, or with a measurement of the compensation force in force-compensating measurement devices.

In an advantageous embodiment of the invention, the quantity that is being characterized by the parameter is essentially the translatory velocity and/or the angular velocity and/or the translatory acceleration and/or the angular acceleration and/or the kinetic energy, in particular the energy of the angular movement, of the force-transmitting portion. Preferably, the mobility sensor is designed to directly measure the quantities that are of interest, as this will allow the signal of the mobility sensor to be reduced to meaningful data at the earliest stage possible. The transmission of less relevant data, for example the angle of inclination or the absolute position of the force-transmitting portion, can in this case be avoided. Furthermore, the parameter that characterizes the mobility can also be determined from a statistical evaluation of the signal of the mobility sensor, for example from the variance of the measured signal.

In a preferred embodiment of the invention, the mobility being characterized by the parameter is the mobility in at least one direction that is essentially orthogonal to the direction of the force flow path in the force-transmitting portion. Preferably, the mobility sensor is designed to measure the mobility in that direction. With this restriction of functionality, a simpler and more cost-effective design of the mobility sensor is possible.

A further advantageous embodiment includes the feature that the threshold value is preset and/or an action of the force-measuring device is triggered in case the threshold value is either not attained or is exceeded or is being crossed in the downward direction. This ensures that given criteria are always met, for example that the force-transmitting portion always has a minimal amount of mobility. With an appropriate choice of the threshold value, the danger that a force shunt will occur without being noticed can thus be largely excluded.

In a further embodiment of the invention, the measuring signal of the measurement transducer, specifically a signal indicating the detection of a change of the applied force, is used for the definition of a time interval during which the parameter is measured and/or compared to the threshold value. This allows the cause and effect of the movements of the force-transmitting portion to be determined and to be used for a reliable assessment of the signals of the mobility sensor. Furthermore, by defining a time interval, the determination of the parameter can be kept within defined limits and focused, allowing an efficient collection and analysis of the data.

In a further embodiment of the invention, the action consists of issuing a warning and/or alarm, and/or of suspending the display and/or transmission of the measurement signal ($S_F$) and the measurement values generated from the signal. Thus, the user is alerted to the danger of erroneous measurements and/or prevented from using the results of erroneous measurements.

According to a further exemplary embodiment of the invention, the force-transmitting portion includes a movable force receiver and either a rod or a deformable body, in particular a self-aligning strut. In this configuration, the method according to the invention proves to be especially advantageous, as this type of force-measuring device is often used under difficult operating conditions.

In a further example of an embodiment, the mobility of the force-transmitting portion is determined in reference to given Cartesian coordinates or given spherical coordinates, and the parameter is determined based on the mobility or change in mobility as referenced against the given coordinate system. With this concept, a high degree of precision can be achieved in the measurements, as the spatial direction of movement, which is especially well suited for characterizing the mobility, may be more accurately determined based on the center of rotation which is a known element of the design. As the freedom of movement of the system is known, the process can be strongly simplified with a coordinate transformation.

For example, if the mobility is referenced to a spherical coordinate system in which at least one coordinate is referenced to the vertical, the momentary angle of inclination $\theta$ of the force-transmitting portion can be calculated easily. The angle of inclination $\theta$ is in this case the angle between the momentary direction of the force-transmitting portion and the vertical direction, wherein the latter is defined by the force of gravity. By determining the mobility in reference to these coordinates, it is therefore possible to build an accurate and reliable sensor for the dynamic inclination of the force-transmitting portion and/or the force-measuring module.

Based on the momentary angle of inclination $\theta$, the angular velocity $V_\theta$ can be calculated as the time derivative. Also, analogous to the variance of a signal, the specific angular energy $E_\theta$ associated with the inclination angle $\theta$ is particularly well suited to be used as parameter M for characterizing the movement of the force-transmitting portion. The specific angular energy $E_\theta$ is in this case proportional to the square of the angular velocity $V_\theta$:

$$E_\theta \sim V_\theta^2$$

The coordinate transformation of the signal components can be realized in a variety of ways, for example as an arithmetic program in a microprocessor, through analog circuitry, or in the form of commercially available preassembled arithmetic modules. In addition, operations such as the differentiation used to determine the inclination angle velocity or the squaring used to calculate the specific angular energy can also be performed together with the transformations. Finally, the aforementioned operations can also be incorporated directly in the signal-processing of the mobility sensor, so that the output signal of the mobility sensor is available directly in the form of a parameter to characterize the movement of the force-transmitting portion and/or of the force-measuring module.

Of course, what has been said above about the processing of sensor signals is not limited to angle-dependent movements of the force-transmitting portion but can also be directly applied to translatory movements such as the translatory velocity and/or the translatory acceleration and/or the translatory kinetic energy of the force-transmitting portion and/or the force-measuring module.

Instead of calculating the specific angular energy $E_\theta$ as parameter M to characterize the movement of the force-transmitting portion and/or the force-measuring module, it is also possible, as an approximation, to calculate the specific energy as:

$$E^* \sim (V_x)^2 + (V_y)^2$$

based on the sum of the squares of the velocity component $V_x$ in the x-direction and the velocity component $V_y$ in the y-direction.

In a further preferred embodiment, the movement of the force-transmitting portion in at least one direction is measured with a mobility sensor, and this measurement in at least one direction is then arithmetically converted, e.g. through a coordinate transformation, in accordance with the spatial orientation of the mobility sensor to a further direction of movement, based on which the parameter M is determined.

The mobility sensor is preferably designed to be direction-sensitive in at least one given direction. Through arithmetic conversion or coordinate transformation it is possible, even without a specific spatial orientation of the mobility sensor, to adapt the measurement of the direction of movement in a simple manner to a further direction of movement, for example to the actual spatial mobility of the force-transmitting portion.

The coordinate transformation is preferably defined through given configuration parameters which are based on the orientation of the mobility sensor in its installed state. This has the advantage that the transformation can be adapted to any orientation of the installed mobility sensor in space or in a plane through a simple adaptation of the configuration parameters. Accordingly, the mobility of the force-transmitting portion for example in a direction that is orthogonal to the direction of the force flow path can be determined without a major adjustment of the mobility sensor.

In a further embodiment of the invention, the mobility sensor is rigidly connected to the force-transmitting portion. This allows the movement of the force-transmitting portion to be detected directly and with a high degree of accuracy.

In a further embodiment of the invention, the force-measuring device is configured as a modular system with at least two force-measuring modules, each of which includes a measurement transducer. With this concept, measurement signals of the individual force-measuring modules can be correlated to each other, which offers a particularly simple way to locate error sources. Each force-measuring module preferably includes a mobility sensor. However, the mobility sensor can also have a direct connection to the force receiver, in particular to the weigh bridge and, in addition, the measurement signals of the force-measuring modules can also be used in the processing of the signals of the mobility sensor.

In a further embodiment of the invention, the force-measuring module has a housing that encloses the measurement transducer, and the mobility sensor is arranged in the housing or on the housing. With this arrangement, the mobility sensor is largely insulated from the components that are involved in the force measurement, in particular from the measurement transducer and the deformable body. Consequently, the possibility of the two essentially independent measurements influencing each other can be avoided.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIGS. 4a to 4c are further schematic drawings of the force-measuring device 200 of FIG. 3 serving to determine the weights of vehicles, wherein at least one of the force-measuring modules 201 is equipped with a mobility sensor 250, and wherein FIG. 4a shows a further mobility sensor 250 attached to a weigh bridge 230, FIG. 4b shows accumulations of dirt between the movable and the fixed parts of the scale, and FIG. 4c shows a downward dislocation of the force-measuring device 200 by an angle α;

FIGS. 5a and 5b are schematic drawings of a force-measuring module 201 according to FIG. 3, wherein the mobility sensor 250 has the form of an integrated circuit, shown in FIG. 5a in cross-section from the side and in FIG. 5b in a sectional plane defined by the line A-A of FIG. 5a; and FIGS. 6a to 6c represent time graphs of the measurement signals of a weight measurement with a force-measuring module 201 according to FIG. 5, wherein FIG. 6a shows a measurement signal $S_F$ of the weight measurement and FIGS. 6a and 6b show the corresponding signals of the mobility sensor expressed in terms of the inclination angle θ and the specific angular energy $E_θ$.

DETAILED DESCRIPTION OF EXEMPLARY EMBODIMENT(S)

Figure 1:
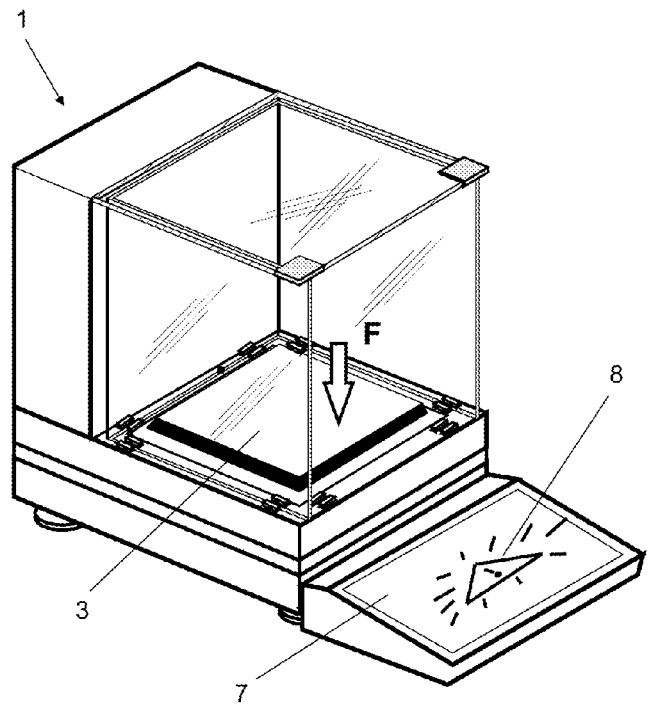
FIG. 1 represents a force-measuring device 1 according to the invention in the form of a balance of an exemplary configuration with a symbolically indicated input force F, a force receiver 3, and an indicator unit 7 displaying a warning notice 8.

FIG. 1 shows a force-measuring device 1 according to the invention in the form of a balance of an exemplary configuration with a symbolically indicated input force F acting on a force receiver 3 in the form of a measuring plate or weighing pan. The condition of the force-measuring device 1 is monitored with a method and device according to the present invention, and interference factors which could cause errors in the weighing result are communicated to a user by way of an indicator unit 7, for example through a warning notice 8 appearing on a liquid crystal display.

Figure 2:
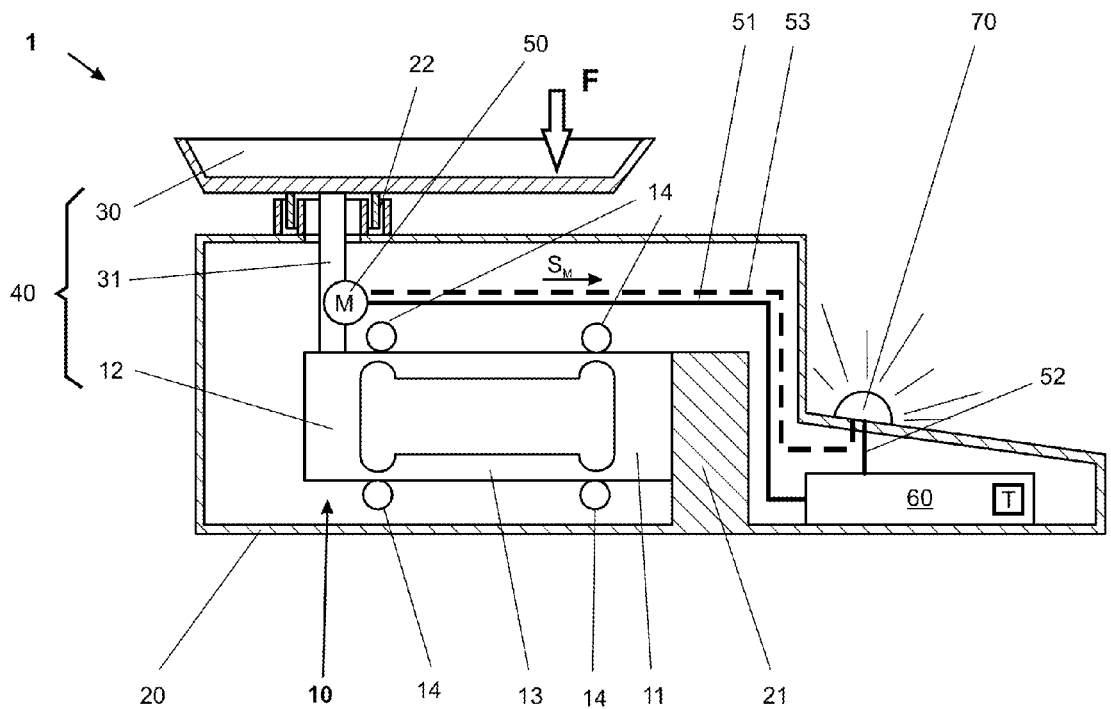
FIG. 2 represents a schematically simplified drawing of a balance in a sectional view, with a force-transmitting portion 40 and a mobility sensor 50 that is connected to a comparator 60 from which an output value is passed on to an indicator unit 70.

FIG. 2 represents a schematically simplified drawing of a force-measuring device 1 in the form of a balance with a force-measuring cell 10 shown in cross-section. The force-measuring cell 10 has a stationary part 11 and a movable part 12, which are connected to each other through an intermediate part 13. The movements of the movable part 12 are received by four measurement converters 14 and converted into a measurement signal that corresponds to the input force F. This measurement signal is then passed on, either directly or through a signal-processing stage, to an indicator unit 70 or to a further processing device.

The force-measuring cell 10 is arranged in the interior space of a housing 20 and its stationary part is rigidly connected to the housing 20 through the housing-based support 21. A force receiver 30 in the form of a weighing pan is arranged outside of the housing 20 and connected by a rod 31 to the force-receiving part 12 of the force-measuring cell 10 which is arranged in the interior space. The rod 31 passes through the housing 20, without touching the latter, by way of a passage opening 22. The passage opening 22 is configured to avoid or at least strongly reduce the risk of dirt entering the housing. The force receiver 30, the rod 31 and the movable part 12 of the force-measuring cell 10 are parts of the movable force-transmitting portion 40 of the force-measuring device 1.

A mobility sensor 50 is arranged on the movable force-transmitting portion 40, in this case on the rod 31, to monitor a parameter M which characterizes the mobility of the force-transmitting portion. In this example, the parameter being determined is the velocity of the rod 31 in the horizontal direction. However, the parameter M can also be the acceleration or the kinetic energy of the force-transmitting portion 40. A signal $S_M$ of the mobility sensor 50 corresponding to the parameter M that has been determined is sent for further processing through a first connector line 51 to a signal-processing unit that includes a comparator 60. However, the mobility sensor 50 could also be arranged on the force receiver 30 or on the force-measuring cell 10.

The comparator 60 is connected through a second connector line 52 to the indicator unit 70, in this case a light-emitting diode, and transmits the output signals generated by the comparator 60 to the indicator unit 70. However, the comparator 60 can also be incorporated in the mobility sensor 50. The output signals generated by the comparator 60 can in this case be sent directly to the indicator unit 70 by way of a third connector line 53 (indicated by a broken line).

As soon as the parameter M, in this example the kinetic energy of the rod 31, is found to fall short of, or fall below, a predefined minimal threshold value T, the comparator 60 triggers an action of the balance. In this arrangement, the comparator 60 can also be incorporated directly in the measuring and/or processing electronics of the balance that processes the signals of the measurement converters 14. The comparator 60 can further be configured as a digital arithmetic unit that is preceded in the processing path by an analog/digital converter.

The indicator unit 70 can be arranged either directly on the outside of the housing 20, or at a location separate from the housing 20, or it can also be mounted inside the housing 20 if the latter is transparent and/or permeable to sound, so that the indication can still be seen or heard. Symbols and alarms that are specially tailored to the message or warning to be issued can increase the impact on a person. Thus, it is conceivable to use generally known pictograms such as for example traffic signs, or symbols specifically created for the intended warning. By using different blinking frequencies for a visual indication or by using different levels of loudness and pitch for an audible indication it is possible to signal the degree of importance of the warning or message. Each of the connector lines 51, 52, 53 in the embodiment of FIG. 2 can be either a cable connection such as a signal cable, a bus system and the like, or a wireless connection.

In this example, a minimal permissible threshold value T is predefined for the parameter M and thus for the kinetic energy of the rod 31. If this minimal threshold is not reached in a typical load change, the low level of kinetic energy can be interpreted as an indication that the freedom of movement of the force-transmitting portion 40 is restricted. As a consequence, the comparator 60 triggers a corresponding action of the balance, for example the indication of a warning message 8 to the user.

In a case where the parameter does not come up to, exceeds, or falls short of the predefined threshold value T and a measurement of the input force is about to be taken, one action of the balance can consist of a repeat measurement that is triggered by the fact that the balance interprets the measurement value as unstable or falling considerably below or above the weighing range. A measurement can also be repeated more than once, at least over a certain tolerable time interval, but only until the measured kinetic energy has risen to a value above the threshold value T. If the aforementioned tolerable time interval is exceeded or the measured value of the parameter M continues to be too low, the measuring process can be interrupted and/or blocked, and/or a readiness indication can be turned off. As a next step, the value of the measured kinetic energy together with a time marker is stored in a log file in the signal-processing unit, specifically in a memory storage unit that is incorporated in the signal-processing unit. This provides traceability.

As a further action of the balance, specifically the signal-processing unit of the latter, the signal $S_M$ of the mobility sensor 50 or the output signal of the comparator 60 can be sent to the indicator unit 70 where a corresponding indication can be displayed. In addition, the indicator unit 70 can issue an acoustical alarm or an optical warning such as a blinking light, or the display can show a warning message, information, or trouble-shooting instructions.

Figure 3:
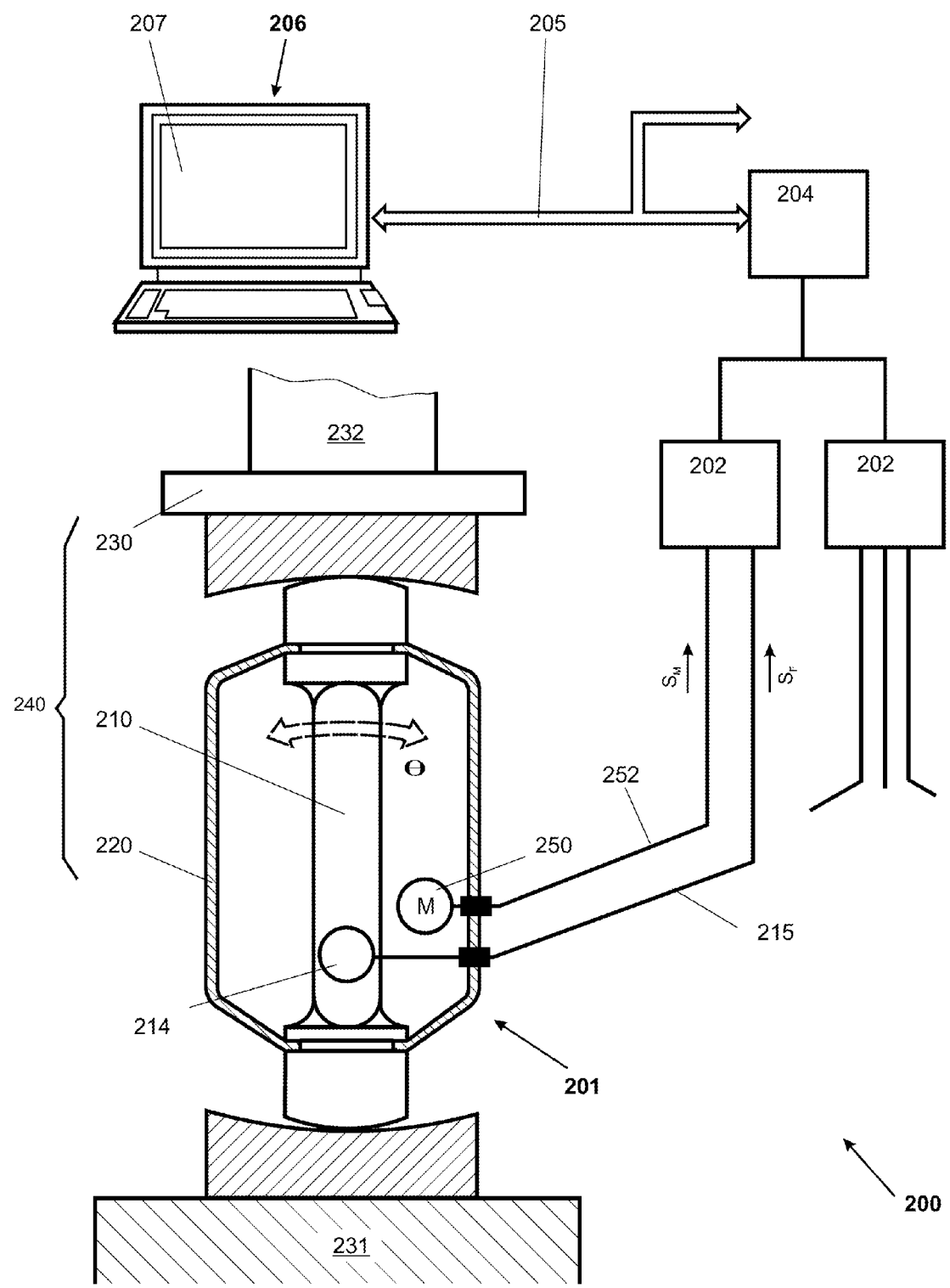
FIG. 3 is a schematic drawing of an exemplary force-measuring device 200 in the form of a tank weighing device with a movable force-measuring module 201 shown in cross-section, equipped with a mobility sensor 250 that is suitable for the implementation of a method according to the invention and which is connected to a computer unit 206 by way of a connector line 252.

FIG. 3 shows a force-measuring device 200 in the form of a tank weighing device with a movable force-measuring module 201 shown in sectional view, which is monitored with the method according to the invention. Tank-weighing devices are used in particular in industrial plants for weighing the contents of pools, tanks, reactor vessels and the like. Normally, several movable force-measuring modules 201 are used per container to be weighed. They are arranged under the container feet 232 or under a force receiver 230 supporting the container feet and are, in turn, supported by the foundation 231. Thus, every foot 232 of the container rests on a movable force-measuring module 201. In order to measure the weight of the container and/or of its contents, the measurement signals $S_F$ generated by the force-measuring modules 201 have to be added up, as each signal represents a partial mass. The force-measuring modules 201 therefore normally don't have indicator units of their own. The measurement signals $S_F$ of the individual force-measuring modules 201 of a container are transmitted for example to a computer unit 206, which can be a system controller, where the signals are processed and subsequently presented, most commonly as part of a system synopsis, on the indicator unit 207 which is incorporated in the system controller. The measurement signals $S_F$ can be analog signals, but they preferably have the form of digital measurement signals or digital measurement values.

The force-measuring module 201 includes a deformable body 210 which is enclosed in a housing 220. The housing 220 is normally welded to the deformable body 210 and hermetically sealed from the ambient environment of the force-measuring module 201. During a measurement, the deformable body 210 as well as the housing 220 are elastically compressed. The influence that the stiffness of the housing has on the measurement signal $S_F$ can be partially compensated, and the hysteresis of the force-measuring module 201 in relation to the measurement range is negligible.

The mobility sensor 250 is connected to a computer unit 206 by way of a connector line 252, a transmitter 202, a segment coupler 204 and a bus system 205. The measurement signal $S_F$ of the force-measuring module 201 can be transmitted to the computer unit 206 either by way of these connections or through a dedicated measurement signal connection 215.

The mobility sensor 250 serves to determine a parameter M which characterizes the mobility of the force-transmitting portion 240. This parameter M is sent to the computer unit 206 in the form of a signal $S_M$ of the mobility sensor 250. The force-transmitting portion 240 includes the movable force-receiving element 230 and the rocker-pivoted force-measuring module 201. The force-measuring module 201, in turn, includes a deformable body 210 with the attached housing 220. The mobility sensor 250 is mechanically connected to the housing 220, so that the movements of the force-measuring module 201, represented by a dashed double arrow with an inclination angle $\theta$ are shared directly with the mobility sensor 250.

The computer unit 206 is for example the central computer of a process control system. Depending on the configuration of the force-measuring device 200 and the computer unit 206, the mobility sensor 250 automatically transmits signals $S_M$ of the mobility sensor 250 to the computer unit 206 either continuously or at periodic and/or random intervals or after the occurrence of a change. Of course, the computer unit 206 can also call up the signals from the mobility sensor continuously, periodically, or on a random basis. Since several force-measuring modules 201 are used per container, the signals $S_M$ of each mobility sensor 250 can be verified or plausibility-tested by mutual comparison with the respective signals of the mobility sensors of the other force-measuring modules. However, suitable predetermined values for the verification may have been stored already in the mobility sensor 250 or in the computer unit 206. These stored values can be based for example on published tables that were collected with other instruments or assembled from internet data. For example, data that are specific to the geographic location where the force-measuring device is being used, such as the ranges of barometric pressure, temperature and radiation, or data regarding seismic vibrations, are readily available and can be used for the verification of the signals $S_M$ of the mobility sensor 250. If a part of these signals $S_M$ is stored over time in the computer unit 206 in the sense of a history, the analysis of this data history can serve to gain additional knowledge about the condition of the force-measuring module 201 as well as the condition of the mobility sensor 250.

Figure 4A:
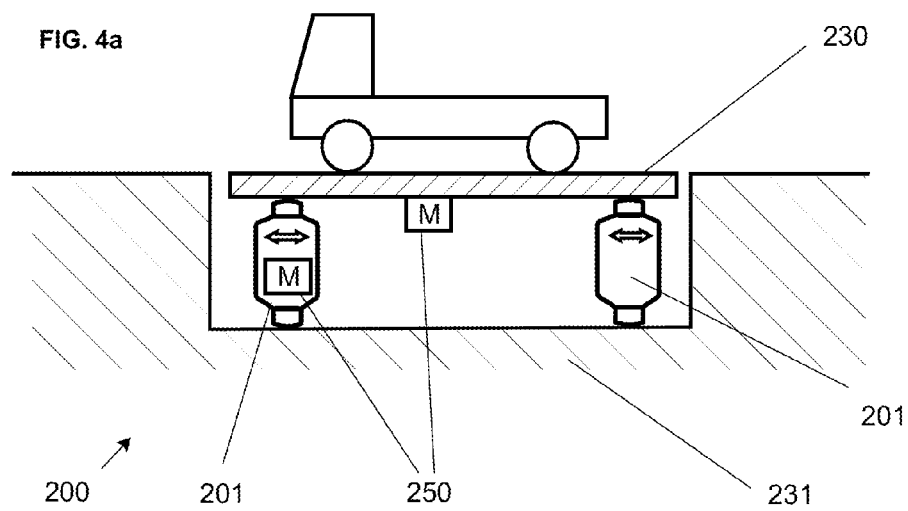
Figure 4B:
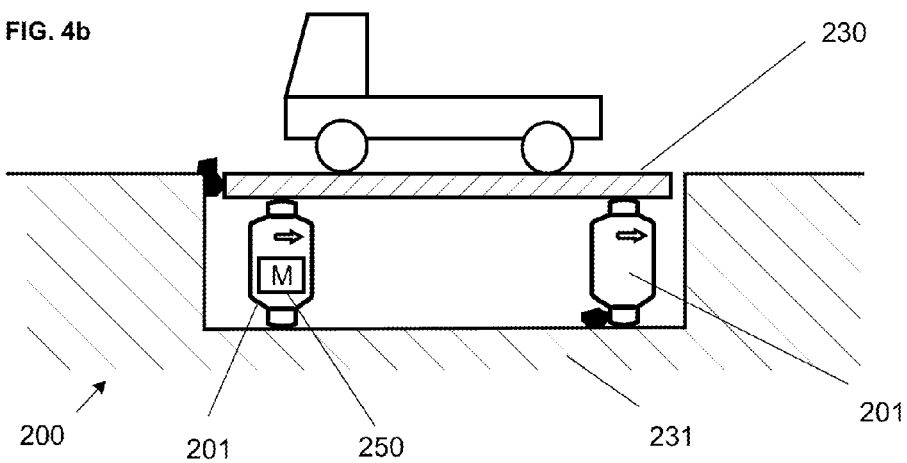
Figure 4C:
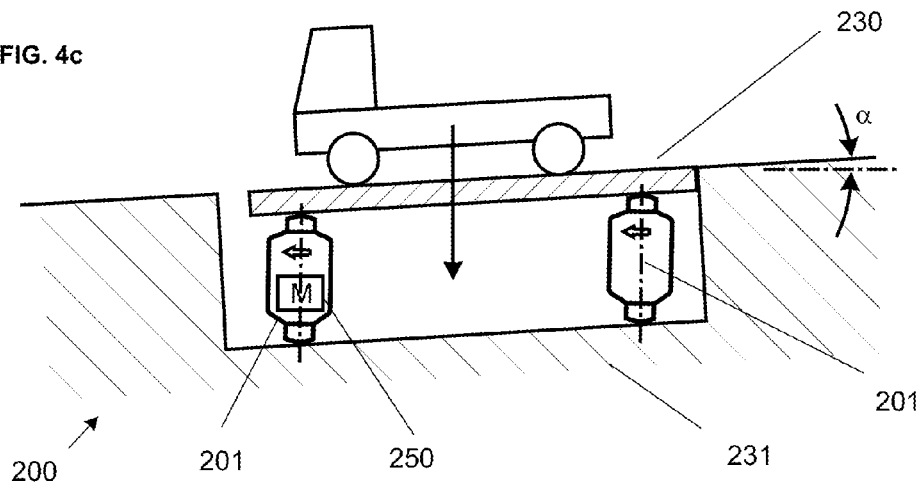

FIGS. 4a to 4c are schematic drawings of the force-measuring device 200 for vehicle weights of FIG. 3 with several force-measuring modules 201. Two force-measuring modules are shown as representative examples for a larger number of force-measuring modules 201, as the force receiver 230 in the form of a weigh bridge is typically seated on four force-measuring modules 210 and a force-measuring device 200 is constituted by several weigh bridges. The foundation 231 is normally configured as a pit that is recessed into the ground, so that vehicles can conveniently be driven on and off the weigh bridge. In the illustrated example a mobility sensor 250 is arranged on one individual force-measuring module 201. To determine the mobility of the force receiver 230, it may be enough to equip an individual force-measuring module 201 with a mobility sensor 250. It is advantageous, however, if several force-measuring modules 201 are equipped with mobility sensors 250 in order to gain more informative measurement results and to improve the possibilities of pinpointing the sources of errors.

FIG. 4a shows an example where an additional mobility sensor 250 is arranged at the force receiver 230, the latter being configured as a weigh bridge. It is also conceivable to use only a single mobility sensor 250, which is arranged at the force receiver 230. In this case, likewise, the mobility of the force-transmitting portion, and in particular the mobility of the force receiver 230, can be reliably determined.

A possible error source is illustrated in FIG. 4b. Two examples are shown here where dirt has accumulated between the foundation 231 and the movable parts, namely at the force receiver 230 and at one of the force-measuring modules 201. Each of these dirt accumulations restricts the freedom of movement of the movable parts, as is symbolically indicated by the arrows that are pointed in only one direction. The fact that movement occurs in only one direction can be detected and brought to the attention of the user with the mobility sensor 250 and the associated signal-processing data.

A further error source is illustrated in FIG. 4c, namely a one-sided settling of the foundation 231 by a possibly very small angle α. The force-measuring modules 201 automatically compensate for the inclined position of the foundation 221 by always aligning themselves parallel to the force acting on them, i.e., parallel to the vertical force of gravity. However, this causes the force receiver 230 to shift its position, so that the edge of the force receiver touches the foundation 231. In this case, likewise, the freedom of movement of the force receiver is restricted as indicated by the arrows pointing in the remaining direction of free movement. In this case, again, the problem situation is brought to the attention of the user.

Figure 5A:
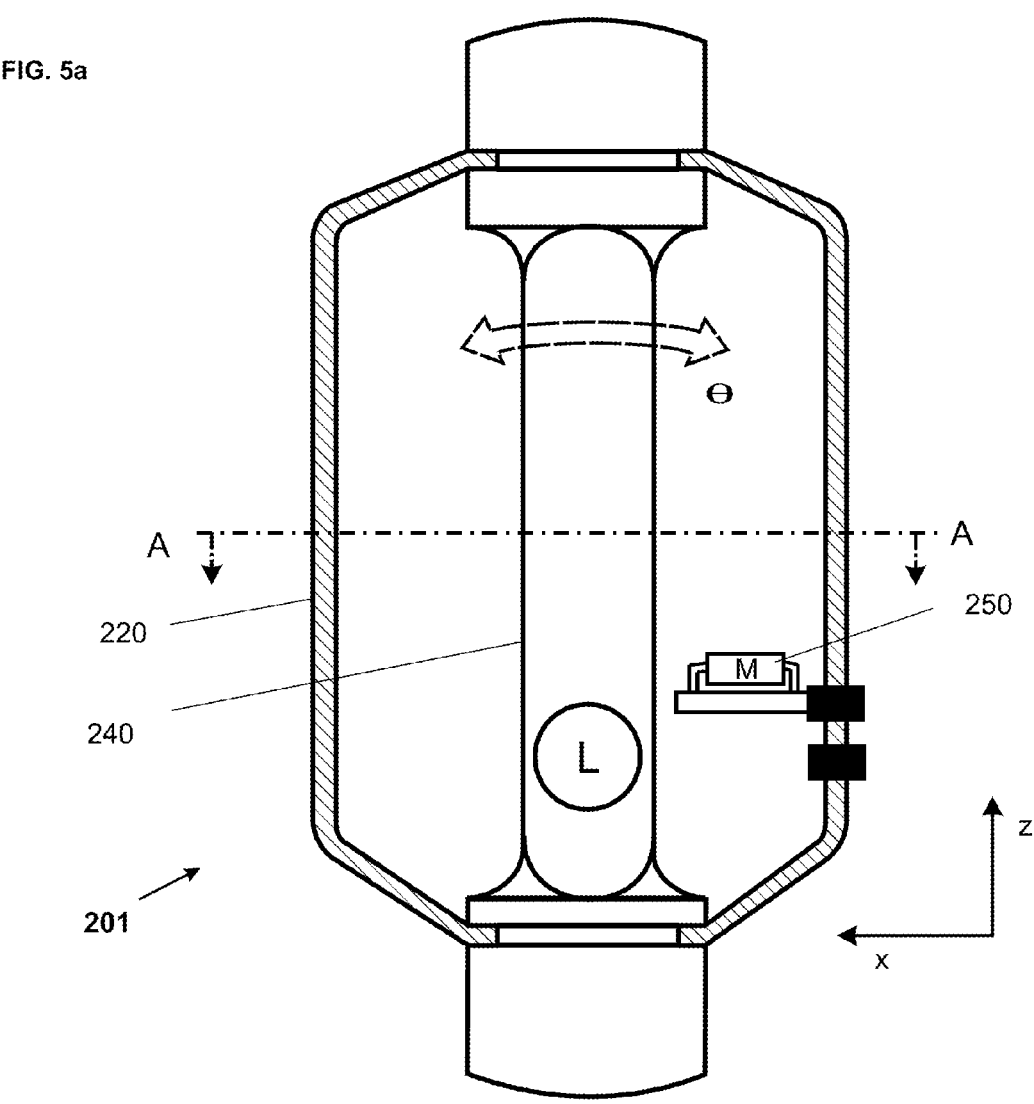
Figure 5B:
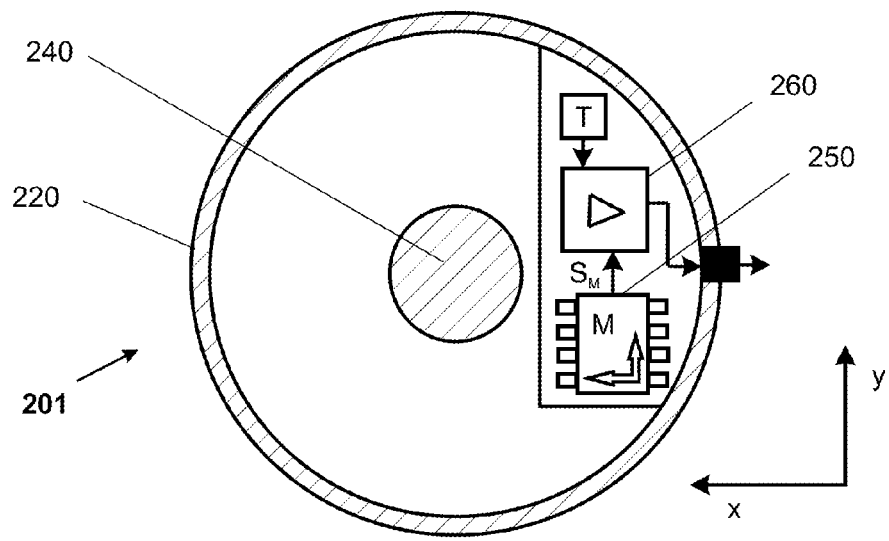

FIGS. 5a and 5b schematically illustrate a force-measuring module 201 according to FIG. 3 wherein the mobility sensor 250 is realized in the form of an integrated circuit. FIG. 5a represents a sectional view from the side, and FIG. 5b represents the view in the sectional plane that is indicated by the line A-A in FIG. 5a. For the mobility sensor 250 one can use a commercially available sensor of a type that is suitable for measuring a mobility or movement of the force-transmitting portion 240, for example an acceleration sensor. The mobility sensor in the illustrated embodiment is able to detect movements in the spatial directions x and y. The directions x and y define a plane which is essentially orthogonal to the z-direction, the latter representing the direction of the force-transmitting portion 240, i.e. the direction of the force flow path in the deformable body 210.

One could also use three-dimensional mobility sensors 250 to determine the mobility of the force-measuring module 201 and of the deformable body 210 that is part of the force-measuring module. Three-dimensional sensors generate for each of the three spatial coordinates a corresponding signal. Thus, each of the signals is correlated with a respective spatial component of the movement.

By using a three-dimensional mobility sensor 250, it is possible to perform a coordinate transformation to change the orientation of the coordinate system in which the sensor signal components are defined. This has the advantage that the results of the measurements can be adapted to any mounting position of the mobility sensor 250 with a simple set of configuration parameters that define the coordinate transformation. Thus, the mobility of the deformable body 210 relative to the directions x and y that run orthogonal to the direction of the deformable body 210 can also be determined accurately (as opposed to a merely approximate determination) if the mobility sensor is not aligned with any special orientation.

Based on the signals of the three-dimensional mobility sensors, the momentary angle of inclination θ of the deformable body 210 is calculated by means of a transformation into spherical coordinates. From this angle of inclination θ, the angular velocity of the angle of inclination is determined as the time derivative dθ/dt of the angle of inclination θ, and from the angular velocity the specific angular energy $E_\theta$ is calculated according to the formula:

$$E_\theta \sim (d\theta/dt)^2$$

The specific angular energy $E_\theta$ of the angle of inclination θ calculated in this manner then serves as the parameter M for characterizing the movement of the deformable body 210.

The preferred choice for the mobility sensor 250 is a commercially available mobility sensor, for example of the type SCA3000 made by VTI Technologies. This sensor is based on a capacitative sensor element with three acceleration-sensitive masses, an ASIC-based signal-processing section and a digital interface. This allows a very compact and cost-effective design delivering signals in a suitable output format.

As illustrated schematically in FIG. 5b, the mobility sensor 250 is connected to a comparator 260 that is arranged in the force-measuring module 201. The signal $S_M$ of the mobility sensor 250, expressed for example as the kinetic energy $E_\theta$, is passed along directly to the comparator 260. The latter compares the signal $S_M$ of the mobility sensor 250 to a preset threshold value T and triggers an action of the force-measuring device 200 if the value for $E_\theta$ does not come up to, exceeds, or falls below the threshold value T. Accordingly, instead of the signal $S_M$ being transmitted continuously, the transmission is now limited to the reporting of specific individual events to the computer unit 206, whereby the stream of data is strongly reduced.

Of course, what has been said here about the processing of the sensor signals is not limited to angular movements of the force-transmitting portion but is also fully applicable to translatory movements, such as the translatory velocity and/or the translatory acceleration and/or the translatory kinetic energy of the movable force-transmitting portion according to FIG. 2.

Figure 6A:
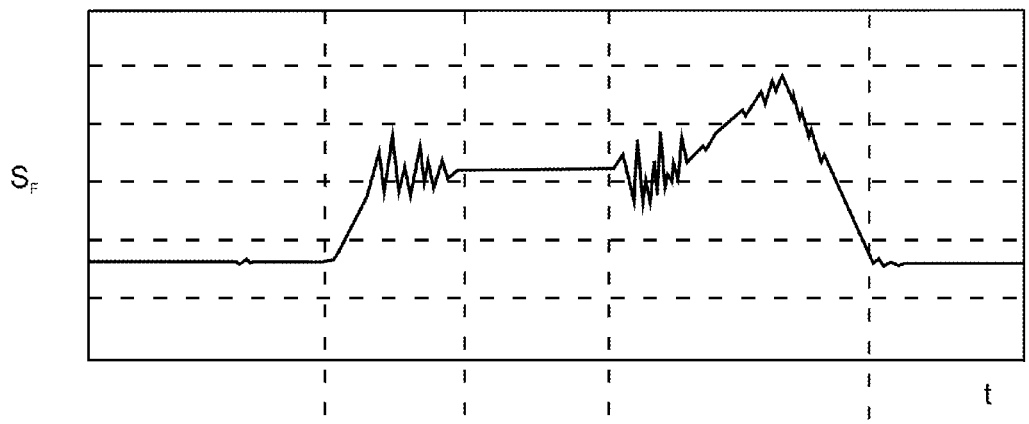
Figure 6B:
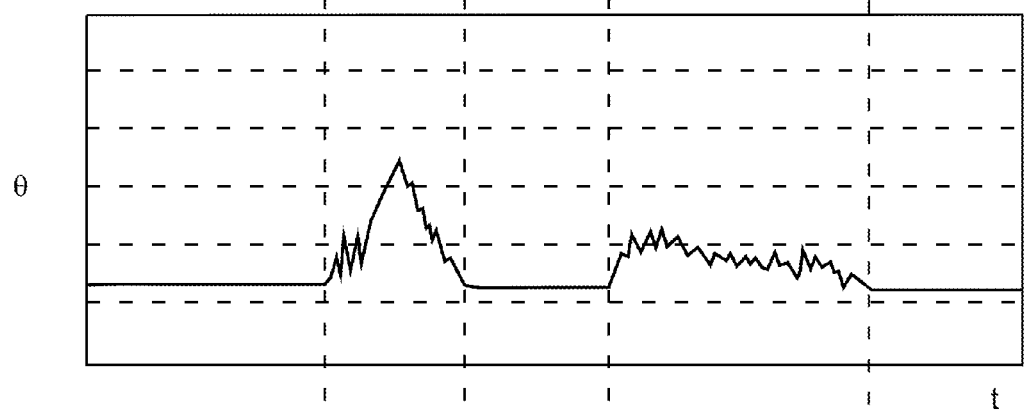
Figure 6C:
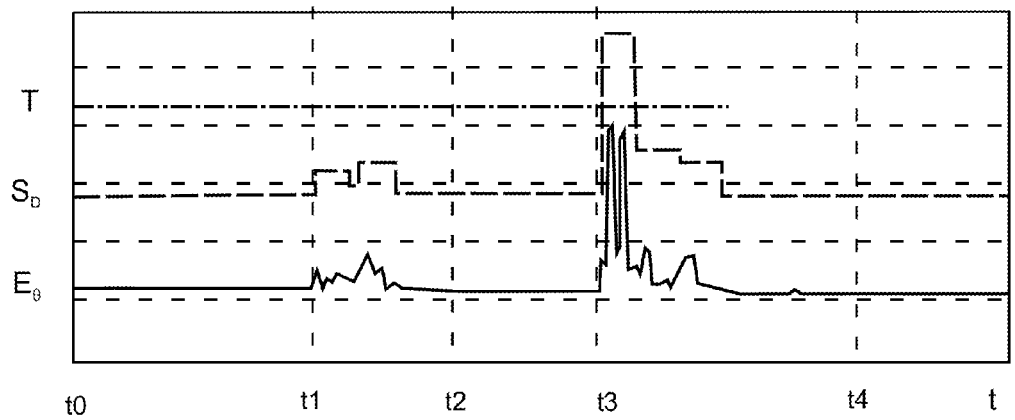

FIGS. 6a to 6c show examples of time graphs of the measurement signals collected in a weight measurement that was performed with a force-measuring module 201 according to FIG. 5. The measuring signal $S_F$ of the weight measurement is plotted in the graph of FIG. 6a, while the corresponding signal of the mobility sensor for the angle of inclination θ is plotted in the graph of FIG. 6b, and the corresponding signal of the mobility sensor for the specific angular energy $E_\theta$ is plotted in the solid-line graph of FIG. 6c.

In addition to the signal of the specific angular energy $E_\theta$, FIG. 6c shows, in a dashed-line graph, the time profile of a signal $S_D$ of the drag pointer. The drag pointer at certain times locks on to a momentary measurement value, in this case the signal of the specific angular energy $E_\theta$, and remains constant at this captured value for a specific time interval. This makes it possible to reliably register and evaluate even transitory events such as signal peaks.

Between the times t0 and t1, the force measuring device is at rest, so that the measurement signal $S_F$ and the corresponding signals of the inclination angle θ and the specific angular energy $E_\theta$ turn out to be essentially constant.

Between the times t1 and t2, a load in the form of a vehicle arrives, which is driven onto the force receiver as shown in FIG. 4. This causes the measurement signal $S_F$ representing the added weight of the vehicle to increase to a higher level. The signal representing the inclination angle θ shows relatively strong fluctuations, which could possibly be connected to a larger angular deflection of the force-measuring modules 201. Still, the specific angular energy $E_\theta$ during this time interval remains at a relatively low value. This could be an indication that the free mobility of the force-transmitting portion is not entirely assured and that the force-transmitting portion is therefore partially constrained, at least at this specific point in time.

The signal of the drag pointer remains below the value of a preset threshold value T. Therefore, when comparing the signal $S_D$ of the drag pointer to the threshold value T, the comparator 260 of FIG. 5 will detect an excessive deviation or a shortfall and will trigger an action of the force-measuring device accordingly.

The actual weighing process takes place between the times t2 and t3. The force-measuring device is in a state of rest, and the signals are largely constant.

Between the times t3 and t4, the force-measuring device returns to the load-free state, for example when the vehicle is driven off. The signal of the inclination angle θ shows less vehement fluctuations than during the loading phase; the signal of the specific angular energy $E_\theta$, on the other hand, reaches significantly higher levels. This leads to the conclusion that the force-transmitting portion 240 in this case appears more likely to have its free mobility.

In a vehicle scale as outlined in FIGS. 4a to 4c, it is particularly advantageous to determine, based on other available information, whether and to what extent the signals represented in FIGS. 6a to 6c are indeed indicating a lack or impairment of the free mobility of the force-transmitting portion. The parameter M which characterizes the free mobility is affected on the one hand by the mass and on the other hand by the speed of the vehicle as it moves on and off the weighing platform. To determine the expression that ties the two aforementioned quantities together, one could for example use the weighing result in order to support a diagnosis regarding the mobility or lack thereof.

Based on these results, the decision whether the measurement should be accepted as valid or whether it should be rejected can be made either by the user of the force-measuring device or in a signal-processing unit arranged downstream in the signal path.

The invention has been described and illustrated in exemplary embodiments. However, based on the concepts taught by the invention, individuals with the requisite technical background will be able to realize further embodiments falling within the scope of the invention.

What is claimed is:

1. A method for monitoring the condition of a force-measuring device having a movable force-transmitting portion through which a force acting on the force-measuring device is transmitted to a measurement transducer that generates a measurement signal corresponding to the applied force, whereupon the signal is brought into the form of a display indication or passed along for further processing, said method comprising:
   determining at least one parameter that characterizes the free mobility of the force-transmitting portion or a change in said free mobility over time;
   comparing said parameter to at least one threshold value; and
   depending on the result of said comparison, detecting either a normal condition or a restriction of the free mobility of the force-transmitting portion of the force-measuring device and, in the case where a restriction of the free mobility of the force-transmitting portion of the force-measuring device has been detected, triggering an action of the force-measuring device.

2. A method according to claim 1, wherein the quantity being characterized by the determined parameter is the specific angular-movement energy that results from one or more of the translatory velocity, angular velocity, translatory acceleration, angular acceleration, and/or kinetic energy of the force-transmitting portion.

3. A method according to claim 1, wherein the quantity being characterized by the determined parameter is the mobility in at least one direction that is oriented substantially orthogonal to the direction of the force flow path in the force-transmitting portion.

4. A method according to claim 1, wherein the threshold value is a given, predetermined value and if said threshold value is not attained, is exceeded, or is crossed in the downward direction, an action of the force-measuring device is triggered.

5. A method according to claim 1, wherein the measurement signal of the measurement transducer is a signal indicating that a change in the input force was detected, and said signal is used to define a time interval during which the parameter is determined and/or during which the determined parameter is compared to the threshold value.

6. A method according to claim 1, wherein triggering an action of the force-measuring device results in one or more effects selected from the group consisting of issuing a warning, issuing an alarm, canceling the display, and ceasing to pass on the measurement signal or the measurement values generated therefrom.

7. A method according to claim 1, wherein the mobility of the force-transmitting portion is determined in reference to given Cartesian coordinates or given spherical coordinates, and the parameter is determined based on the mobility or change in mobility as expressed in terms of these coordinates.

8. A method according to claim 1, wherein the movement of the force-transmitting portion in at least one direction is measured with a mobility sensor and said movement in at least one direction is then arithmetically converted, according to the spatial orientation of the mobility sensor, to a further direction of movement, relative to which direction the parameter is determined, and wherein said arithmetic conversion is performed by means of a coordinate transformation.

9. A force-measuring device, having a movable force-transmitting portion through which a force acting on the force-measuring device is transmitted to a measurement transducer that generates a measurement signal corresponding to the applied force, whereupon the signal may be thereafter transmitted to an indicator unit or to another device for further processing, said device comprising:
- a movable force-transmitting portion that is mechanically connected to a mobility sensor adapted to determine a parameter that characterizes the free mobility of the force-transmitting portion or a change in said free mobility of the force-transmitting portion over time; and
- a comparator electrically connected to said mobility sensor, said comparator operable to compare the determined parameter to at least one threshold value and, depending on the result of the comparison, to trigger an action of the force-measuring device.

10. A force-measuring device according to claim 9, wherein the mobility sensor is adapted to determine one or more of the quantities selected from the group consisting of the translatory velocity, the angular velocity, the translatory acceleration, the angular acceleration, and the kinetic energy of the force-transmitting portion.

11. A force-measuring device according to claim 9, wherein the mobility sensor is adapted to determine the mobility of the force-transmitting portion in at least one direction that is substantially orthogonal to the direction of the force flow path in the force-transmitting portion.

12. A force-measuring device according to claim 9, wherein the force-transmitting portion comprises a movable force receiver and either a rod or a deformable body.

13. A force-measuring device according to claim 12, wherein the force-transmitting portion includes a self-aligning strut.

14. A force-measuring device according to claim 9, wherein the mobility sensor is directly connected to the movable force receiver.

15. A force-measuring device according to claim 9, wherein the mobility sensor is rigidly connected to the force-transmitting portion.

16. A force-measuring device according to claim 9, wherein the force-measuring device is structured as a modular system with at least two force-measuring modules, each of which comprises a measurement transducer.

17. A force-measuring device according to claim 16, wherein at least one of the force-measuring modules comprises a housing that encloses the measurement transducer, and that the mobility sensor is arranged inside said housing or on said housing.

18. A method for monitoring the condition of a force-measuring device having a movable force-transmitting portion through which a force acting on the force-measuring device is transmitted to a measurement transducer that generates a measurement signal corresponding to the applied force, whereupon the signal is brought into the form of a display indication or passed along for further processing, said method comprising:
- determining at least one parameter that characterizes the free mobility of the force-transmitting portion in at least one direction that is oriented substantially orthogonal to the direction of the force flow path in the force-transmitting portion, or a change in said free mobility over time;
- comparing said parameter to at least one threshold value; and
- depending on the result of said comparison, detecting either a normal condition or a restriction of the free mobility of the force-transmitting portion of the force-measuring device and, in the case where a restriction of the free mobility of the force-transmitting portion of the force-measuring device has been detected, triggering an action of the force-measuring device.

19. A force-measuring device having a movable force-transmitting portion through which a force acting on the force-measuring device is transmitted to a measurement transducer that generates a measurement signal corresponding to the applied force, whereupon the signal may be thereafter transmitted to an indicator unit or to another device for further processing, said device comprising:
- a movable force-transmitting portion that is mechanically connected to a mobility sensor adapted to determine a parameter that characterizes the free mobility of the force-transmitting portion in at least one direction that is substantially orthogonal to the direction of the force flow path in the force-transmitting portion, or a change in said free mobility of the force-transmitting portion over time; and
- a comparator electrically connected to said mobility sensor, said comparator operable to compare the determined parameter to at least one threshold value and, depending on the result of the comparison, to trigger an action of the force-measuring device.

* * * * *